United States Patent
Pitsch et al.

(10) Patent No.: US 12,116,758 B2
(45) Date of Patent: Oct. 15, 2024

(54) FAUCET WITH INTEGRATED WATER FILTER

(71) Applicant: AS America, Inc., Piscataway, NJ (US)

(72) Inventors: Walter Pitsch, Washington, NJ (US); Xiaojing Ye, Edison, NJ (US); Emilie Williams, New York, NY (US)

(73) Assignee: AS America, Inc., Piscataway, NJ (US)

( * ) Notice: Subject to any disclaimer, the term of this patent is extended or adjusted under 35 U.S.C. 154(b) by 459 days.

(21) Appl. No.: 17/430,143

(22) PCT Filed: Feb. 11, 2020

(86) PCT No.: PCT/US2020/017602
§ 371 (c)(1),
(2) Date: Aug. 11, 2021

(87) PCT Pub. No.: WO2020/167717
PCT Pub. Date: Aug. 20, 2020

(65) Prior Publication Data
US 2022/0098837 A1 Mar. 31, 2022

Related U.S. Application Data

(60) Provisional application No. 62/878,031, filed on Jul. 24, 2019, provisional application No. 62/804,301, filed on Feb. 12, 2019.

(51) Int. Cl.
*B01D 35/00* (2006.01)
*B01D 35/04* (2006.01)
(Continued)

(52) U.S. Cl.
CPC .............. *E03B 7/074* (2013.01); *B01D 35/04* (2013.01); *B01D 35/1573* (2013.01);
(Continued)

(58) Field of Classification Search
CPC ......... E03B 7/074; E03B 7/071; B01D 35/04; B01D 35/1573; B01D 35/306;
(Continued)

(56) References Cited

U.S. PATENT DOCUMENTS 3,184,064 A * 5/1965 Miller ..................... C02F 1/003
210/287
3,928,201 A * 12/1975 Junck ................... B01D 35/027
210/441
(Continued)

FOREIGN PATENT DOCUMENTS

| CN | 201083299 Y | 7/2008 |
|---|---|---|
| EP | 3192930 A1 | 7/2017 |
| JP | 2008019665 A | 12/2011 |

OTHER PUBLICATIONS

International Search Report mailed May 12, 2020 in corresponding International Application No. PCT/US2020/017602 (3 pages).

*Primary Examiner* — Waqaas Ali
(74) *Attorney, Agent, or Firm* — Tyler A. Stevenson; Anna-lisa L. Gallo (57) ABSTRACT

An integrated faucet filtration system comprising a faucet assembly; a filter assembly; a first T-connector; and a second T-connector; wherein, the faucet assembly comprises a body; a spout; a spray head; a multi-channel hose fluidly coupled to the spray head and disposed in the spout; and a valve cartridge configured to control flow of unfiltered water; the filter assembly comprises a water filter; an electronic actuator; and a solenoid valve; the first T-connecter comprises a first branch configured to receive unfiltered water from a water source; a second branch configured to deliver unfiltered water to the water filter; and a third branch configured to deliver unfiltered water to the valve cartridge; and the second T-connecter comprises a first branch configured to receive unfiltered water from the valve cartridge; a
(Continued)

second branch configured to receive filtered water from the water filter; and a third branch configured to deliver the filtered and unfiltered water.

13 Claims, 4 Drawing Sheets

(51) Int. Cl.
*B01D 35/157* (2006.01)
*B01D 35/30* (2006.01)
*E03B 7/07* (2006.01)
*E03C 1/04* (2006.01)

(52) U.S. Cl.
CPC ............ *B01D 35/306* (2013.01); *E03B 7/071* (2013.01); *E03C 1/0404* (2013.01); *B01D 2201/287* (2013.01); *B01D 2201/304* (2013.01); *B01D 2221/02* (2013.01); *E03C 2001/0415* (2013.01); *E03C 2201/30* (2013.01); *E03C 2201/40* (2013.01)

(58) Field of Classification Search
CPC ........ B01D 2201/287; B01D 2201/304; B01D 2221/02; E03C 1/0404; E03C 2001/0415; E03C 2201/30; E03C 2201/40
See application file for complete search history.

(56) References Cited

U.S. PATENT DOCUMENTS

| | | |
|---|---|---|
| 5,527,451 A | 6/1996 | Hembree et al. |
| 5,660,726 A | 8/1997 | Dluzik |
| 2015/0251922 A1* | 9/2015 | Schuster ................ C02F 1/008 |
| | | 210/323.1 |
| 2015/0354186 A1 | 12/2015 | Tseng et al. |
| 2017/0101325 A1* | 4/2017 | Ye ...................... B01D 35/046 |
| 2018/0318849 A1 | 11/2018 | Cao et al. |

\* cited by examiner

FAUCET WITH INTEGRATED WATER FILTER

The disclosure is directed to a faucet system configured to deliver filtered and unfiltered water, and also to a filter assembly.

BACKGROUND

Faucets are omnipresent plumbing fixtures having the capability to deliver hot water, cold water or a hot water/cold water mixture from a water source (e.g. tap or well water). Tap and well water may contain undesired contaminants and/or additives, for instance chlorine, metals or metal compounds, which may affect taste, smell, appearance and safety of the water. There is increasing desire to install and employ water filters to improve water quality. There is a need for a more durable, simpler, and easy-to-use integrated faucet filtration system.

SUMMARY

Accordingly, disclosed is integrated faucet filtration system comprising a faucet assembly; a filter assembly; a first T-connector; and a second T-connector; wherein, the faucet assembly comprises a body; a spout; a spray head; a multi-channel hose fluidly coupled to the spray head and disposed in the spout; and a valve cartridge configured to control flow of unfiltered water; the filter assembly comprises a water filter; an electronic actuator; and a solenoid valve; the first T-connecter comprises a first branch configured to receive unfiltered water from a water source; a second branch configured to deliver unfiltered water to the water filter; and a third branch configured to deliver unfiltered water to the valve cartridge; and the second T-connecter comprises a first branch configured to receive unfiltered water from the valve cartridge; a second branch configured to receive filtered water from the water filter; and a third branch configured to deliver the filtered and unfiltered water from the first and second branches to different channels of the multi-channel hose; and wherein, the electronic actuator is in electrical communication with the solenoid valve; the electronic actuator is configured to open and close the solenoid valve; and when the solenoid valve is open, the system is configured to deliver filtered water.

Also disclosed is a filter assembly comprising a water filter; an electronic actuator; and a solenoid valve; wherein, the electronic actuator is in electrical communication with the solenoid valve; the electronic actuator is configured to open and close the solenoid valve; and when the solenoid valve is open, the assembly is configured to deliver filtered water.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DISCLOSURE

In an embodiment, an integrated faucet filtration system comprises a faucet assembly, a water filtration assembly and first and second T-connectors. A faucet assembly may comprise a faucet body, a spout, a valve cartridge and a spray head. In some embodiments, the spray head may be a pull-out or pull-down spray head in fluid communication with a multi-channel hose running through the spout and body.

A multi-channel hose is described for example in U.S. Pat. No. 10,183,871. In one embodiment, the multi-channel hose has enough slack to allow for the spray head to be pulled out or down (pulled away from) and returned to the spout. In an embodiment, the multi-channel hose comprises a channel dedicated to delivering unfiltered water and a channel dedicated to delivering filtered water. The multi-channel hose may comprise a flexible material to allow for ease of pull-away from and return to the spout.

In some embodiments, the multi-channel hose comprises two or more concentric layers, wherein an interior layer provides a waterway for filtered water and a space between the interior layer and an outer layer provides a waterway for unfiltered water, or visa-versa. The spray head may comprise corresponding waterways for receiving the filtered and unfiltered water from the hose. In an embodiment, spray head waterways run from a reception portion of the spray head which is coupled to the multi-channel hose, through the spray head, and to corresponding outlets of the spray head configured for separate dispensing of filtered and unfiltered water.

The third branch of the second T-connector may be configured to supply unfiltered water to an unfiltered water waterway of the multi-channel hose and to supply filtered water to a filtered water waterway of the multi-channel hose. The third branch of the second T-connector may comprise concentric water paths configured to couple to concentric waterways of the multi-channel hose. In some embodiments, first and second T-connectors do not require any diverter mechanism, for example any water-controlled diverter mechanism.

In an embodiment, the multi-channel hose may comprise a bonnet configured to couple to a spray head reception portion. The bonnet may include one or more sealing components configured to seal the connection between the multi-channel hose and the spray head.

The system comprises an activation device in electronic communication with a solenoid valve associated with the water filter. In certain embodiments, an electronic activation device, or "electronic actuator" is present on the spray head. Electrical communication may be via a wire (electric cable) connected to the electronic actuator and the solenoid valve. In some embodiments, a wire may be disposed in the multi-channel hose. A wire may exit the hose at a certain location to connect to the solenoid valve. A wire may also be connected to a power source such as a battery. In other embodiments, electrical communication may be wireless, for example Wi-Fi, near field communication, Bluetooth® or ZigBee communication protocols.

The electronic actuator may be present on a front, back, or a side of the spray head. In some embodiments, the electronic actuator may be a toggle switch, a button, a lever, a knob, etc. In some embodiments, the electronic actuator may be configured so that when placed in an "on" position, the solenoid valve is opened, water flows through the water filter and the faucet delivers filtered water. When the electronic actuator is placed in an "off" position, the solenoid valve is closed and water ceases to flow through the water filter and filtered water ceases to flow. In some embodiments, the electronic actuator may be configured so that when manipulated a first time, the solenoid valve is opened to provide filtered water flow and when manipulated a second time, the solenoid valve is closed to stop filtered water flow. In other embodiments, the electronic actuator may have to be held to deliver filtered water and released to stop filtered water flow.

In some embodiments, the electronic actuator may be a button that when pushed a first time, filtered water is delivered by the faucet, and when pushed a second time, filtered water flow ceases and filtered water delivery stops. The electronic actuator may be associated with a circuit board.

In other embodiments, the electronic actuator may be present on the spout, faucet body, or on a faucet base. In some other embodiments, the electronic actuator may be positioned proximate to the water filter. In this instance a wire connecting the electronic actuator to the solenoid valve may be positioned outside of the multi-channel hose; or alternatively, the electronic actuator may be in wireless electrical communication with the solenoid valve.

The water filter is not under pressure when the solenoid is in the default "off" position. Accordingly, the system may not require any pressure regulator that otherwise might be required to ensure the water filter is not under excess water pressure. The term "under pressure" meaning the pressure of a water source.

In some embodiments, the integrated system may comprise one or more indicator lights, configured to display a status of the water filter and/or a battery. In some embodiments, the electronic actuator may be associated with an indicator light, the light configured to display a status of the water filter and/or a battery status. For example, with a button having a circular shape, a filter status indicator light may be configured as a ring encircling the button or as a light proximate the button. In some embodiments, an indicator light may comprise an LED (light emitting diode).

An indicator light may be configured to provide light of different colors (e.g. white, blue, green, red, orange, etc.) indicating that the filter and/or battery is good or no-good and requires replacing—or indicating that the filter and/or battery has a certain expected life remaining, for example 180 days, 150 days, 120 days, 90 days, 60 days, 45 days, 30 days, 15 days, 10 days, or 5 days.

In some embodiments, the integrated system may comprise only one activation device, for instance only the electronic actuator. In other embodiments, the integrated system may comprise an electronic actuator and a mechanical actuator. An electronic actuator and a mechanical actuator may be positioned proximate or distal to each other. In some embodiments, an electronic actuator and a mechanical actuator may both be positioned on the spray head. A mechanical actuator may be configured to select and provide for unfiltered water in different forms, for instance in an aerated form, a spray form, a shower form, a non-aerated single stream form, etc. The spray head may comprise different outlets for each of the different unfiltered water forms.

The solenoid valve is associated with the water filter and is configured to allow/disallow water flow through the water filter to provide filtered water flow when placed in a corresponding open or closed position.

In some embodiments, the water filter assembly may comprise a manifold configured to receive unfiltered water from the second branch of the first T-connector and to deliver filtered water to the second branch of the second T-connector. In some embodiments, unfiltered water enters an inlet of the manifold, flows through the filter, and filtered water exits an outlet of the manifold. In some embodiments, the solenoid valve may be disposed in a water filter manifold and/or coupled to a water filter manifold. In some embodiments, both a filter and a solenoid may be disposed in a water filter manifold and/or coupled to a water filter manifold.

In an embodiment, the faucet assembly may comprise a mixed water hose in fluid communication with the valve cartridge and configured to deliver unfiltered water from the valve cartridge to the first branch of the second T-connector. The mixed water hose may deliver cold water, hot water, or a hot/cold water mixture, adjustable via a faucet handle associated with the valve cartridge. A faucet handle associated with the valve cartridge may control temperature of unfiltered water and also volume of unfiltered water flow.

The valve cartridge is disposed in the faucet body and is associated with a faucet handle. The valve cartridge is configured to receive unfiltered hot and cold water from hot and cold water supplies. The valve cartridge is configured to deliver hot, cold or mixed hot/cold water a mixed water hose. In some embodiments, the valve cartridge controls unfiltered water only.

The faucet assembly in use will be positioned on a deck (i.e. a countertop). In some embodiments, the water filter may be positioned in use so that it is accessible from above the deck. In this instance, the water filter may be replaced, that is removed and a new one installed, from above deck. In other embodiments, the water filter may be positioned below deck. In this instance, the water filter may be accessed from inside a cabinet under the deck.

Figure 1:
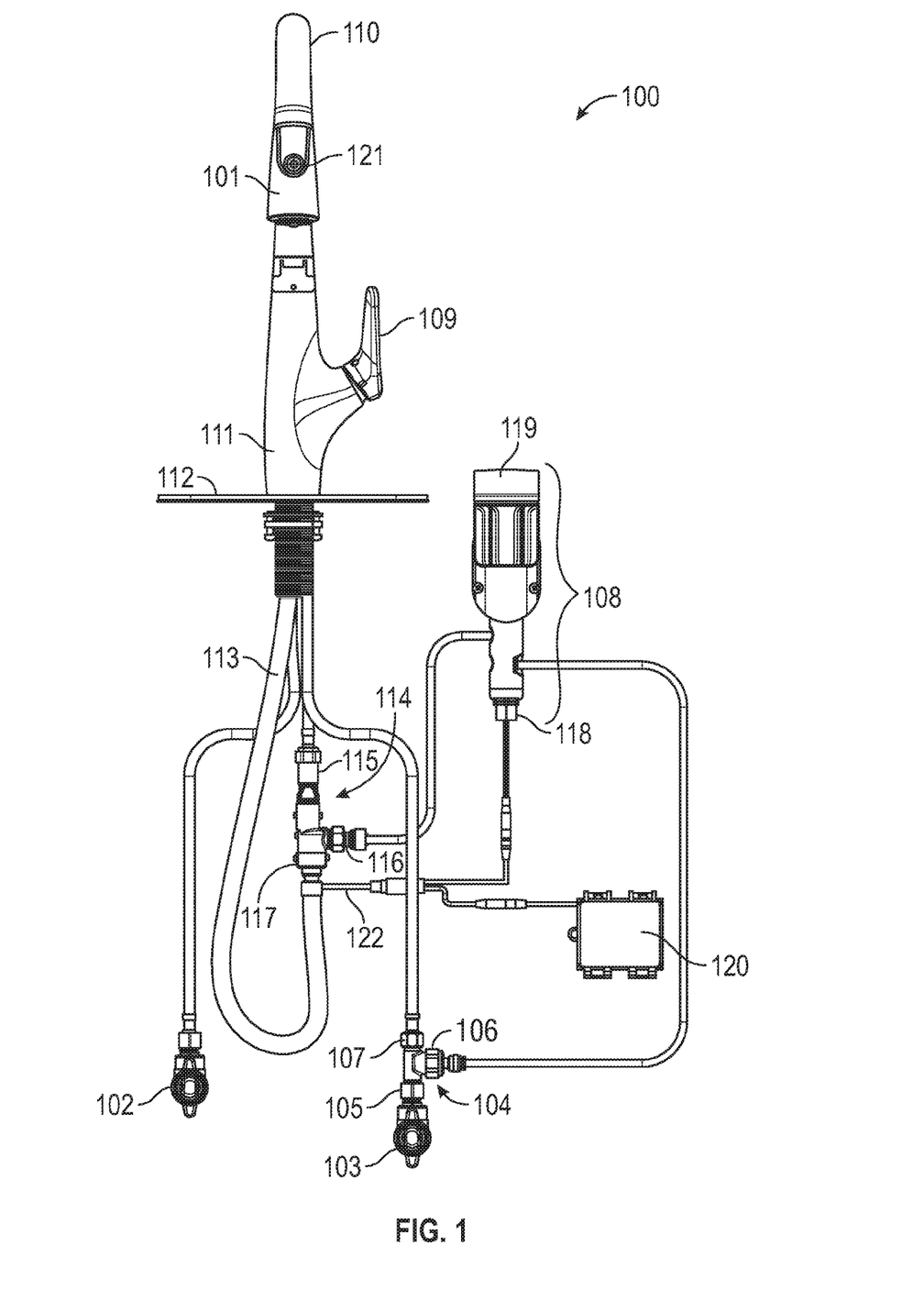
FIG. 1 depicts the integrated faucet filtration system, according to an embodiment.

FIG. 1 depicts integrated faucet filtration system 100 according to an embodiment. The faucet is a pull-down faucet with spray head 101 in a docked position. Hot and cold water is delivered to the system from a water source to inlets 102 and 103, respectively. A first T-connector 104 contains a first branch 105 configured to receive unfiltered water from cold water inlet 103. First T-connector 104 has a second branch 106 configured to deliver unfiltered water to a water filter manifold disposed in water filter assembly 108. First T-connector 104 contains a third branch 107 configured to deliver unfiltered water to a valve cartridge associated with faucet handle 109. The faucet also comprises spout 110, faucet body 111, spray head 101 and base 112. Multi-channel hose 113 is in fluid communication with spray head 101, disposed in body 111, and connected to second T-connector 114. Second T-connector 114 contains a first branch 115 configured to receive unfiltered water from the valve cartridge, a second branch 116 configured to receive filtered water from water filter manifold of water filter assembly 108, and a third branch 117 configured to deliver filtered and unfiltered water to different channels of multi-channel hose 113. Filtered water flow is configured to be started/stopped by opening/closing solenoid valve 118 disposed in filter assembly 108. Water filter assembly 108 in this embodiment comprises a cap 119 that is configured to be positioned on a countertop as is faucet base 112. The solenoid valve is powered by one or more batteries in battery case 120. Spray head 101 comprises a button 121 configured to electronically actuate solenoid valve 118 and to start/stop filtered water flow. An electric cable 122 is disposed in the multi-channel hose, exits below T-connector 114, and also exits the multi-channel hose inside the spray head to connect to button 121. Electric cable 122 connects to button 121 via a connection (not visible). Electric cable 122 connects to the solenoid 118 and to a power source in battery case 120 with connections (respectively, not visible).

Figure 2A:
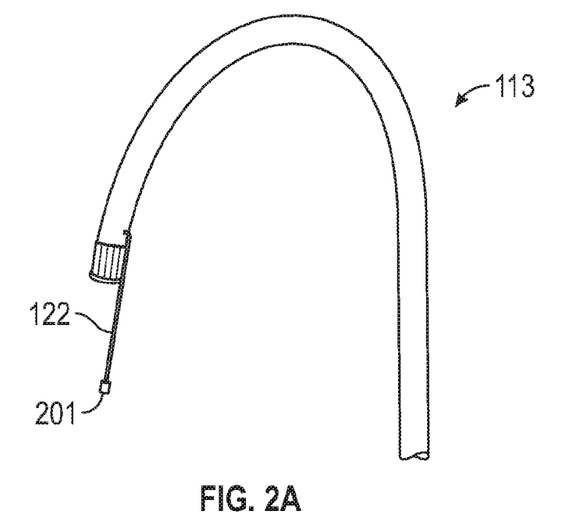
FIG. 2A depicts an upper portion of a multi-channel hose as disposed in a filter spout, according to an embodiment.
Figure 2B:
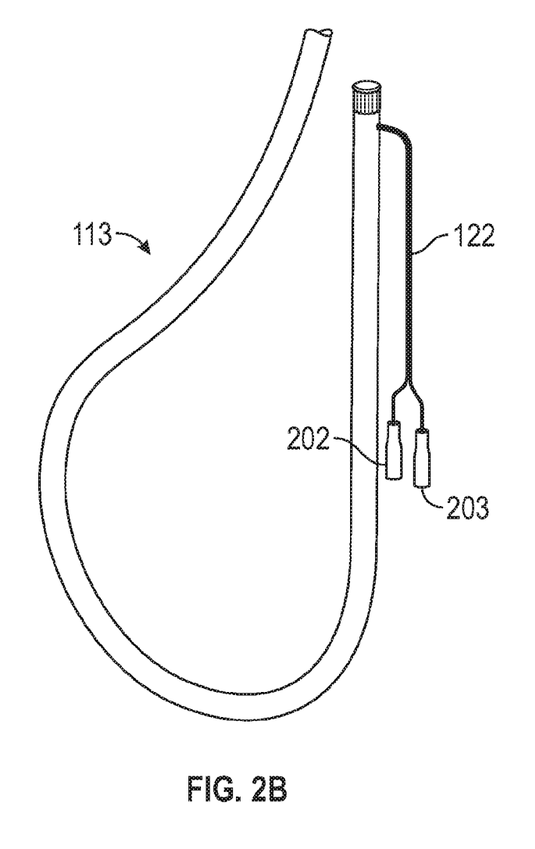
FIG. 2B depicts a lower portion of a multi-channel hose, according to an embodiment.

FIG. 2A and FIG. 2B depict an upper portion of multi-channel hose 113 as disposed in a filter spout and below a deck with slack to allow for pull-down of a spray head, respectively, according to an embodiment. FIG. 2A shows a portion of electric cable (wire) 122 exiting multi-channel hose 113 and having a connection point 201 configured to attach to an electronic actuator disposed on a spray head. FIG. 2B shows portions of the same electric cable 122 exiting multi-channel hose 113 and configured to connect with a solenoid valve (connection point 202) and to connect with a power source (connection point 203).

Figure 3:
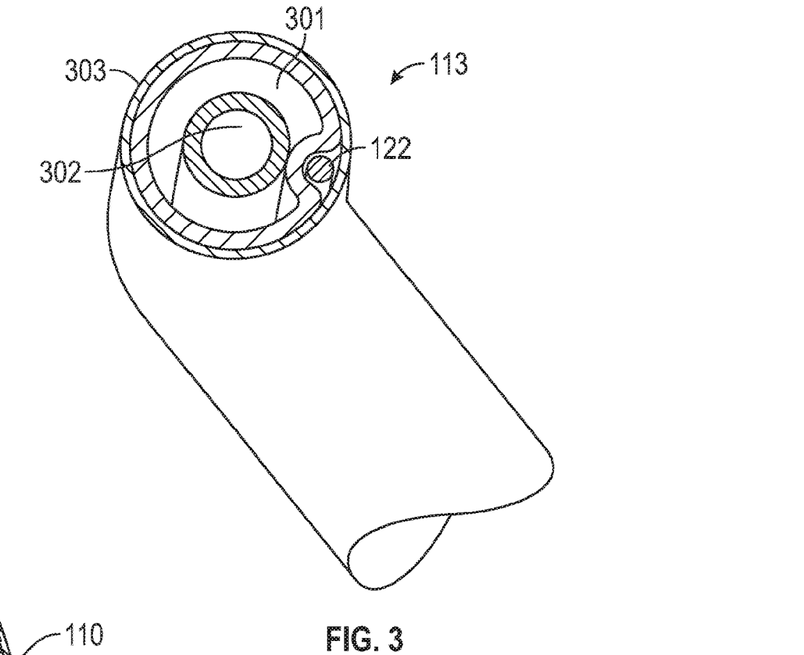
FIG. 3 depicts a cross-section of a multi-channel hose according to an embodiment.

FIG. 3 depicts a cross-section of multi-channel hose 113 according to an embodiment, having electric cable 122 disposed within it. Shown is a channel 301 for delivery of unfiltered water to a spray head and a channel 302 for delivery of filtered water to a spray head. Also shown is a cover layer 303, which layer may comprise braided nylon or stainless steel.

Figure 4:
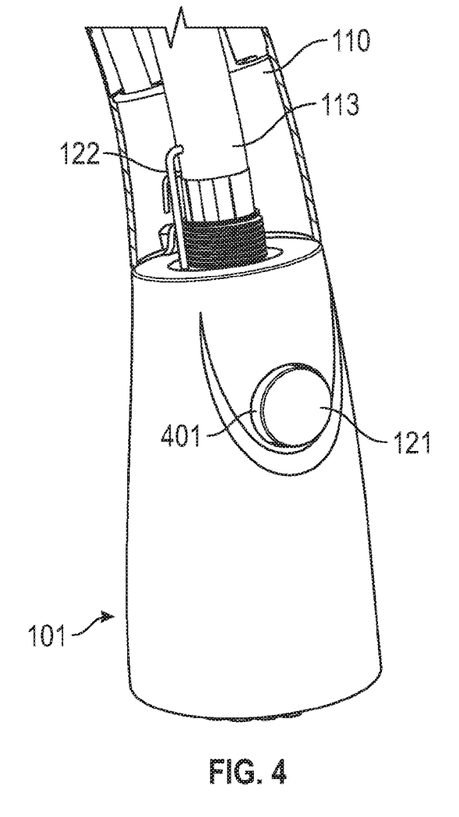
FIG. 4 displays a spray head with a cross-section of a spout according to an embodiment.

FIG. 4 displays spray head 101 according to an embodiment, coupled to faucet spout 110 shown in cross-section. Visible in the spout cross-section are electric cable 122 exiting multi-channel hose 113. Electric cable 122 is electrically coupled to electronic button 121 at connection point 201 (not visible). Electric button 121 is configured to open/close a solenoid valve associated with a water filter assembly. Encircling button 121 is an LED indicator 401, configured to provide a status of a water filter and a battery power source. In an embodiment, a full blue ring, position (1), indicates a fully functional filter. Positions (2), (3), and (4), having partial blue rings, indicate about 75%, about 50%, and about 25% filter capability remaining, respectively. Position (5), having a partial red ring, may indicate about 5% filter capacity remaining. Position (6), having a blinking partial red ring, may indicate a filter needs replacing. Positions (1)-(4) may be one color, for example blue or green. Positions (5) and (6) may be another color, for instance red. Position (7), for example a full orange light ring, may indicate the battery power source is low.

Figure 5A:
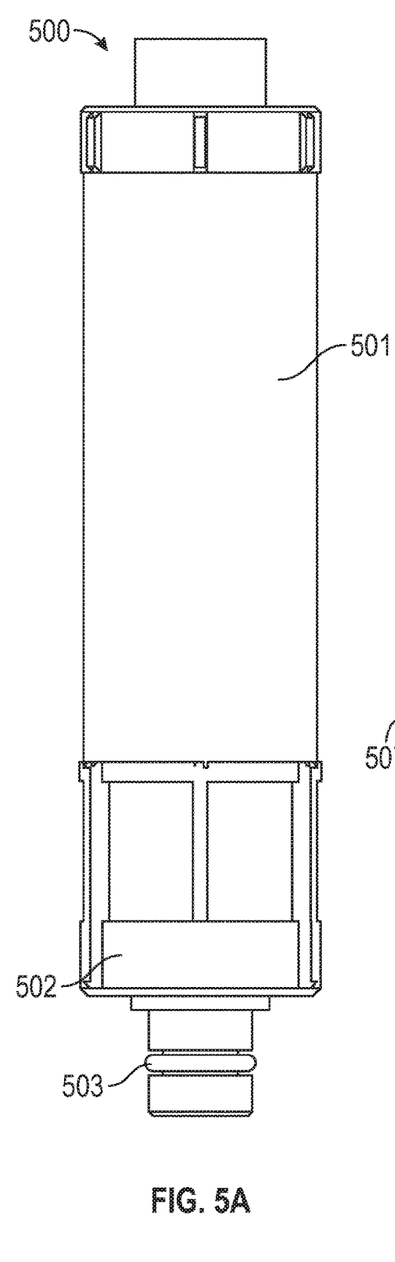
FIG. 5A depicts a water filter sub-assembly, according to an embodiment.
Figure 5B:
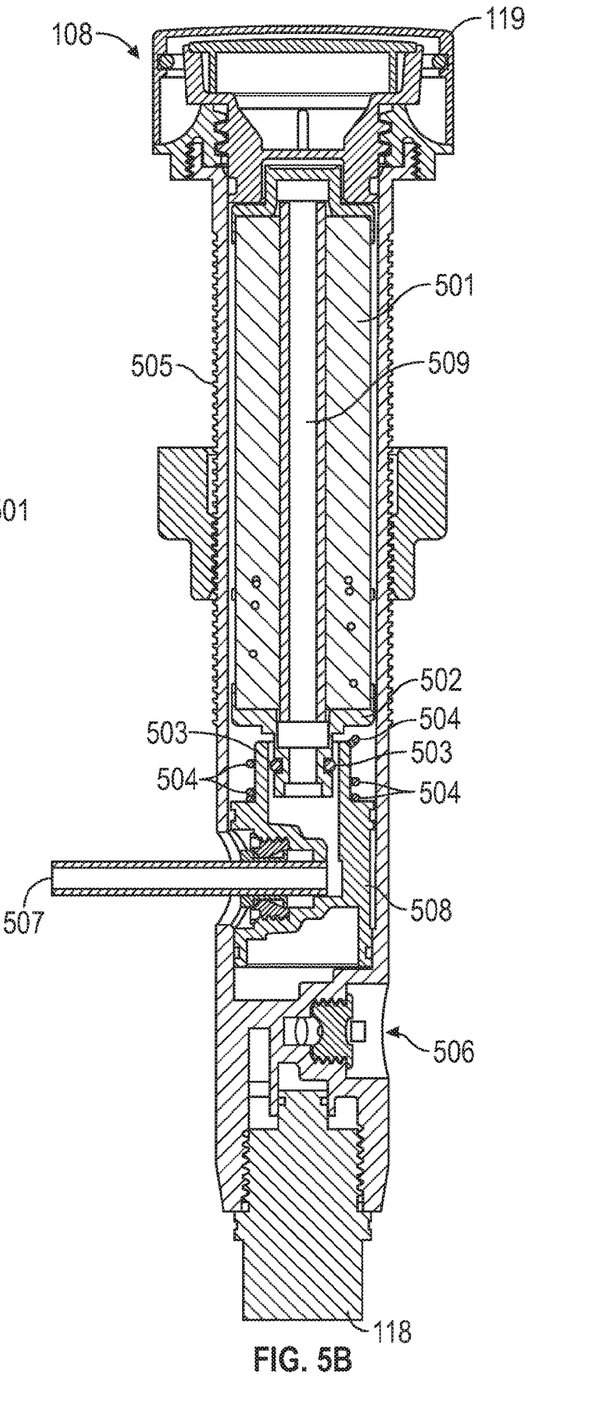
FIG. 5B shows a cross-section view of a water filter assembly, according to an embodiment.

FIG. 5A shows a water filter sub-assembly 500, comprising a filter 501 disposed in insertion adapter 502 comprising O-ring 503, according to an embodiment. O-ring 503 is configured to form a seal in a filter assembly. FIG. 5B shows a cross-section view of water filter assembly 108, according to an embodiment. Shown are filter 501, insertion adapter 502, O-ring 503, and solenoid 118. Sub-assembly 500 may be inserted into housing 505 with a compression spring 504 present under filter 501. Cap 119 is positioned over filter 501. Manifold 508 receives O-ring 503 which forms a seal in manifold 508. A compression spring will be compressed as sub-assembly 500 is inserted into housing 505 and aids in removing a spent filter from a housing. Unfiltered water is delivered to water filter manifold 508 via inlet 506. Filtered water is delivered from manifold 508 to a multi-channel hose via outlet 507. In an embodiment, unfiltered water is delivered from manifold 508 to an exterior of water filter 501, passes through, and filtered water exits filter 501 through interior passage 509 to manifold 508 and to outlet 507.

Following are some embodiments relating to a faucet filtration system.

In a first embodiment, disclosed is an integrated faucet filtration system comprising a faucet assembly; a filter assembly; a first T-connector; and a second T-connector; wherein, the faucet assembly comprises a body; a spout; a spray head; a multi-channel hose fluidly coupled to the spray head and disposed in the spout; and a valve cartridge configured to control flow of unfiltered water; the filter assembly comprises a water filter; an electronic actuator; and a solenoid valve; the first T-connecter comprises a first branch configured to receive unfiltered water from a water source; a second branch configured to deliver unfiltered water to the water filter; and a third branch configured to deliver unfiltered water to the valve cartridge; and the second T-connecter comprises a first branch configured to receive unfiltered water from the valve cartridge; a second branch configured to receive filtered water from the water filter; and a third branch configured to deliver the filtered and unfiltered water from the first and second branches to different channels of the multi-channel hose; and wherein, the electronic actuator is in electrical communication with the solenoid valve; the electronic actuator is configured to open and close the solenoid valve; and when the solenoid valve is open, the system is configured to deliver filtered water.

In a second embodiment, disclosed is a system according to embodiment 1, wherein a base of the faucet body is positioned on a deck and the water filter is configured to be accessed from above the deck.

In a third embodiment, disclosed is a system according to embodiments 1 or 2, wherein the system comprises a mechanical actuator configured to select a form of unfiltered water.

In a fourth embodiment, disclosed is a system according to any of the preceding embodiments, wherein the electronic actuator is configured to be manipulated a first time to open the solenoid valve and to deliver filtered water, and configured to be manipulated a second time to close the solenoid valve to stop filtered water flow.

In a fifth embodiment, disclosed is a system according to any of the preceding embodiments, wherein the spray head is configured to be pulled away from and returned to the spout.

In a sixth embodiment, disclosed is a system according to any of the preceding embodiments, wherein the electronic actuator and the solenoid valve are in electrical communication via a wire or a wireless connection.

In a seventh embodiment, disclosed is a system according to any of the preceding embodiments, wherein the electronic actuator and the solenoid valve are in electrical communication via a wire disposed in the multi-channel hose.

In an eighth embodiment, disclosed is a system according to any of the preceding embodiments, wherein the filter assembly comprises a manifold configured to receive unfiltered water from the second branch of the first T-connector and to deliver filtered water to the second branch of the second T-connector.

In a ninth embodiment, disclosed is a system according to any of the preceding embodiments, wherein the filter assembly comprises a manifold and the solenoid valve is disposed in and/or coupled to the manifold, and/or the water filter is disposed in and/or coupled to the manifold.

In a tenth embodiment, disclosed is a system according to any of the preceding embodiments, wherein when the solenoid valve is closed, the water filter is not under water pressure.

In an eleventh embodiment, disclosed is a system according to any of the preceding embodiments, wherein the system comprises one or more indicator lights, the indicator lights configured to display a status of the water filter and/or a battery.

In a twelfth embodiment, disclosed is a system according to any of the preceding embodiments, comprising a battery, wherein the battery is configured to power the solenoid valve.

In a thirteenth embodiment, disclosed is a system according to any of the preceding embodiments, wherein the electronic actuator is positioned on the spray head.

In a fourteenth embodiment, disclosed is a system according to any of the preceding embodiments, wherein the valve cartridge is disposed in the faucet body and associated with a faucet handle, and wherein the valve cartridge is configured to deliver hot water, cold water, or a hot water/cold water mixture to the second T-connector.

In a fifteenth embodiment, disclosed is a system according to any of the preceding embodiments, wherein the valve cartridge is configured to deliver only unfiltered water.

In a sixteenth embodiment, disclosed is a system according to any of the preceding embodiments, wherein the water filter is disposed in an insertion adapter comprising an O-ring.

In a seventeenth embodiment, disclosed is a system according to any of the preceding embodiments, wherein the filter assembly comprises a compression spring, wherein the spring is compressed under the water filter.

Following are some embodiments relating to a filter assembly.

In a first embodiment, disclosed is a filter assembly comprising a water filter; an electronic actuator; and a solenoid valve; wherein, the electronic actuator is in electrical communication with the solenoid valve; the electronic actuator is configured to open and close the solenoid valve; and when the solenoid valve is open, the assembly is configured to deliver filtered water.

In a second embodiment, disclosed is a filter assembly according to embodiment 1, wherein the filter assembly is configured to be in fluid communication and electrical communication with a faucet assembly, wherein a base of a faucet body is positioned on a deck, and wherein the filter assembly is configured to be accessed from above the deck.

In a third embodiment, disclosed is a filter assembly according to the first or second embodiments, wherein the electronic actuator is configured to be manipulated a first time to open the solenoid valve and to deliver filtered water, and configured to be manipulated a second time to close the solenoid valve to stop filtered water flow.

In a fourth embodiment, disclosed is a filter assembly according to any of the preceding embodiments, wherein the electronic actuator and the solenoid valve are in electrical communication via a wire or a wireless connection.

In a fifth embodiment, disclosed is a filter assembly according to any of the preceding embodiments, wherein the filter assembly comprises a manifold configured to receive unfiltered water from a water source and to deliver filtered water to a plumbing fixture. A plumbing fixture may be a faucet, a shower, a bathtub, a bidet, a spigot, a water heater, a heating system, and the like.

In a sixth embodiment, disclosed is a filter assembly according to any of the preceding embodiments, wherein the filter assembly comprises a manifold and the solenoid valve is disposed in and/or coupled to the manifold, and/or the water filter is disposed in and/or coupled to the manifold.

In a seventh embodiment, disclosed is a filter assembly according to any of the preceding embodiments, wherein when the solenoid valve is closed, the water filter is configured to not be under water pressure.

In an eighth embodiment, disclosed is a filter assembly according to any of the preceding embodiments, wherein the assembly comprises one or more indicator lights, the indicator lights configured to display a status of the water filter.

In a ninth embodiment, disclosed is a filter assembly according to any of the preceding embodiments, comprising a battery, wherein the battery is configured to supply power to the solenoid valve.

In a tenth embodiment, disclosed is a filter assembly according to any of the preceding embodiments, wherein the water filter is disposed in an insertion adapter comprising an O-ring.

In an eleventh embodiment, disclosed is a system according to any of the preceding embodiments, wherein the filter assembly comprises a compression spring, wherein the spring is compressed under the water filter.

When elements are configured to receive from or configured to deliver or provide to another element, or when elements are coupled to other elements regarding fluid flow, the elements are in fluid communication with each other.

The terms "coupled" or "connected" may mean that an element is "attached to" or "associated with" another element. Coupled or connected may mean directly coupled or coupled through one or more other elements. An element may be coupled to an element through two or more other elements in a sequential manner or a non-sequential manner. The term "via" in reference to "via an element" may mean "through" or "by" an element. Coupled or connected or "associated with" may also mean elements not directly or indirectly attached, but that they "go together" in that one may function together with the other.

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive.

All U.S. patent applications, published patent applications and patents referred to herein are hereby incorporated by reference.

The invention claimed is:

1. An integrated faucet filtration system comprising
a faucet assembly;
a filter assembly;
a first T-connector; and
a second T-connector;
wherein,
the faucet assembly comprises
a faucet body having a base configured to be positioned on a deck;
a spout;
a spray head;

a multi-channel hose fluidly coupled to the spray head and disposed in the spout; and a valve cartridge configured to control flow of unfiltered water;

the filter assembly comprises a water filter configured to be accessed from above the deck;

an electronic actuator; and a solenoid valve;

the first T-connecter comprises a first branch configured to receive unfiltered water from a water source;

a second branch configured to deliver unfiltered water to the water filter; and a third branch configured to deliver unfiltered water to the valve cartridge; and the second T-connecter comprises a first branch configured to receive unfiltered water from the valve cartridge;

a second branch configured to receive filtered water from the water filter; and a third branch configured to deliver the filtered and unfiltered water from the first and second branches to different channels of the multi-channel hose; and wherein, the electronic actuator is in electrical communication with the solenoid valve;

the electronic actuator is configured to open and close the solenoid valve;

when the solenoid valve is open, the system is configured to deliver filtered water; and the electronic actuator and the solenoid valve are in electrical communication via a wire disposed in the multi-channel hose.

2. The system according to claim 1, wherein the system comprises a mechanical actuator configured to select a form of unfiltered water.

3. The system according to claim 1, wherein the electronic actuator is configured to be manipulated a first time to open the solenoid valve to deliver filtered water, and to be manipulated a second time to close the solenoid valve to stop filtered water flow.

4. The system according to claim 1, wherein the spray head is configured to be pulled away from and returned to the spout.

5. The system according to claim 1, wherein the filter assembly comprises a manifold configured to receive unfiltered water from the first T-connector and to deliver filtered water to the second T-connector.

6. The system according to claim 1, wherein the system comprises one or more indicator lights, the indicator lights configured to display a status of the water filter and/or of a battery.

7. The system according to claim 1 comprising a battery, wherein the battery is in electrical communication with the solenoid valve.

8. The system according to claim 1, wherein the electronic actuator is positioned on the spray head.

9. The system according to claim 1, wherein the valve cartridge is disposed in the faucet body and associated with a faucet handle, and wherein the valve cartridge is configured to deliver hot water, cold water, or a hot water/cold water mixture to the second T-connector, the valve cartridge configured to deliver only unfiltered water.

10. The system according to claim 1, wherein the water filter is disposed in an insertion adapter comprising an O-ring.

11. The system according to claim 1, wherein the filter assembly comprises a compression spring, wherein the spring is compressed under the water filter.

12. The system according to claim 1, wherein the filter assembly comprises a manifold and the solenoid valve and the water filter are disposed in and/or coupled to the manifold.

13. The system according to claim 1, wherein when the solenoid valve is closed, the water filter is not under water pressure.

* * * * *